(12) United States Patent  (10) Patent No.: US 7,391,132 B2
Chen  (45) Date of Patent: Jun. 24, 2008

(54) METHODS AND APPARATUS PROVIDING DOUBLE CONVERSION/SERIES-PARALLEL HYBRID OPERATION IN UNINTERRUPTIBLE POWER SUPPLIES

(76) Inventor: Huei-Jung Chen, 13F., No. 10, Lane 115, Siouming Rd., Taipei (TW)

( * ) Notice: Subject to any disclaimer, the term of this patent is extended or adjusted under 35 U.S.C. 154(b) by 342 days.

(21) Appl. No.: 11/002,319

(22) Filed: Dec. 3, 2004

(65) Prior Publication Data
US 2006/0119184 A1 Jun. 8, 2006

(51) Int. Cl.
H02J 3/00 (2006.01)
H02M 5/40 (2006.01)
H02M 5/458 (2006.01)

(52) U.S. Cl. .............................. 307/43; 363/34; 363/37
(58) Field of Classification Search .................. 363/34; 307/43
See application file for complete search history.

(56) References Cited

U.S. PATENT DOCUMENTS

| | | | | |
|---|---|---|---|---|
| 4,709,318 | A | * | 11/1987 | Gephart et al. ................. 363/37 |
| 5,136,494 | A | * | 8/1992 | Akagi et al. .................... 363/34 |
| 5,686,768 | A | | 11/1997 | Thomsen et al. .............. 307/64 |
| 6,160,722 | A | | 12/2000 | Thommes et al. ............. 363/37 |
| 6,204,627 | B1 | * | 3/2001 | Watanabe et al. ............ 318/729 |
| 6,266,260 | B1 | | 7/2001 | Zahrte, Sr. et al. .......... 363/132 |
| 6,295,215 | B1 | * | 9/2001 | Faria et al. .................... 363/37 |
| 6,310,787 | B2 | * | 10/2001 | Ito et al. ........................ 363/34 |
| 6,556,457 | B1 | * | 4/2003 | Shimazaki et al. ............ 363/34 |
| 6,744,648 | B2 | | 6/2004 | Chen ............................. 363/98 |
| 6,753,622 | B2 | * | 6/2004 | Oughton, Jr. .................. 307/64 |
| 6,856,137 | B2 | * | 2/2005 | Roden et al. ................. 324/509 |
| 7,019,989 | B2 | * | 3/2006 | Kobayashi et al. ............ 363/37 |
| 7,050,312 | B2 | * | 5/2006 | Tracy et al. .................... 363/37 |
| 2003/0155928 | A1 | * | 8/2003 | Roden et al. ................. 324/509 |
| 2003/0227785 | A1 | * | 12/2003 | Johnson, Jr. ................... 363/37 |

OTHER PUBLICATIONS

Nasiri et al., "Reduced parts single-phase series-parallel UPS systems with active filter capabilities", The 25th Internatonal Telecommunication Energy Conference, 2003, INTELEC, pp. 366-372.

(Continued)

*Primary Examiner*—Michael J Sherry
*Assistant Examiner*—Hal I Kaplan
(74) *Attorney, Agent, or Firm*—Birch, Stewart, Kolasch & Birch, LLP (57) ABSTRACT

An uninterruptible power supply (UPS) includes an AC power source, a DC power source coupled to a DC bus, a load, a converter, an inverter and a controller. Responsive to the controller, the inverter receives power from the DC bus to supply the load a regulated voltage; the converter, operated in a hybrid mode, receiving power from the AC power source to supply the DC bus a regulated DC voltage in a double conversion mode or to supply the power to the load in a series-parallel mode, or a combination of the two modes. In the stored energy mode, with an additional bypass switch, both the converter and inverter receive power from the DC power source and jointly supply the load a high quality voltage. These configurations improve the efficiency and enable the UPS readily meet the VFI and the high quality output voltage requirements per IEC62040-3.

18 Claims, 7 Drawing Sheets

OTHER PUBLICATIONS

Solter et al., "A new international UPS classification by IEC 62040-3: Method of specifying the performance and test requirments", The 24th International Telecommunication Energy Conference, 2002, INTELEC, pp. 541-545.

Dixon, "Average current mode control of switching power supplies", Application Note U-140, Unitrode Corporation, pp. 356-369.

* cited by examiner

METHODS AND APPARATUS PROVIDING DOUBLE CONVERSION/SERIES-PARALLEL HYBRID OPERATION IN UNINTERRUPTIBLE POWER SUPPLIES

BACKGROUND OF THE INVENTION

1. Field of Invention

The invention relates to power supplies, and more particularly to the structures and control method of uninterruptible power supplies.

2. Related Art

Uninterruptible power supply systems have been widely used to protect electrical equipments from damages or failures caused by utility power disturbances. There are ten commonly recognized utility power disturbances; nine of the disturbances are voltage related and one of the disturbances is frequently related.

International standard IEC62040-3 introduces a three step UPS classification code to standardize the UPS performance, which is briefly illustrated in "A New International UPS Classification by IEC 62040-3" (The 24$^{th}$ International Telecommunication Energy Conference, 2002.) by Wilhelm Solter According to the definition of IEC62040-3 STEP1, VFI represents that UPS output voltage is independent of the input supply voltage and frequency variations. VI represents that UPS output voltage is dependent on the input supply frequency variations, but is independent of the supply voltage variations. VFD represents that UPS output is dependent on the input supply voltage and frequency variations. IEC62040-3 STEP1 defines VFI as UPS classification 1, VI as UPS classification 2 and VFD as UPS classification 3. The double conversion UPS is the only structure to meet the VFI requirement.

However, though most double conversion UPS feature the VFI, the high power loss and poor efficiency resulted from their intrinsic series-series structures have inspired the invention of new UPS structure; for example, an UPS structure according to U.S. Pat. No. 5,686,768, an UPS structure according to U.S. Pat. No. 6,744,648 and in FIG. 1, a structure also known as the Delta conversion UPS.

Figure 1:
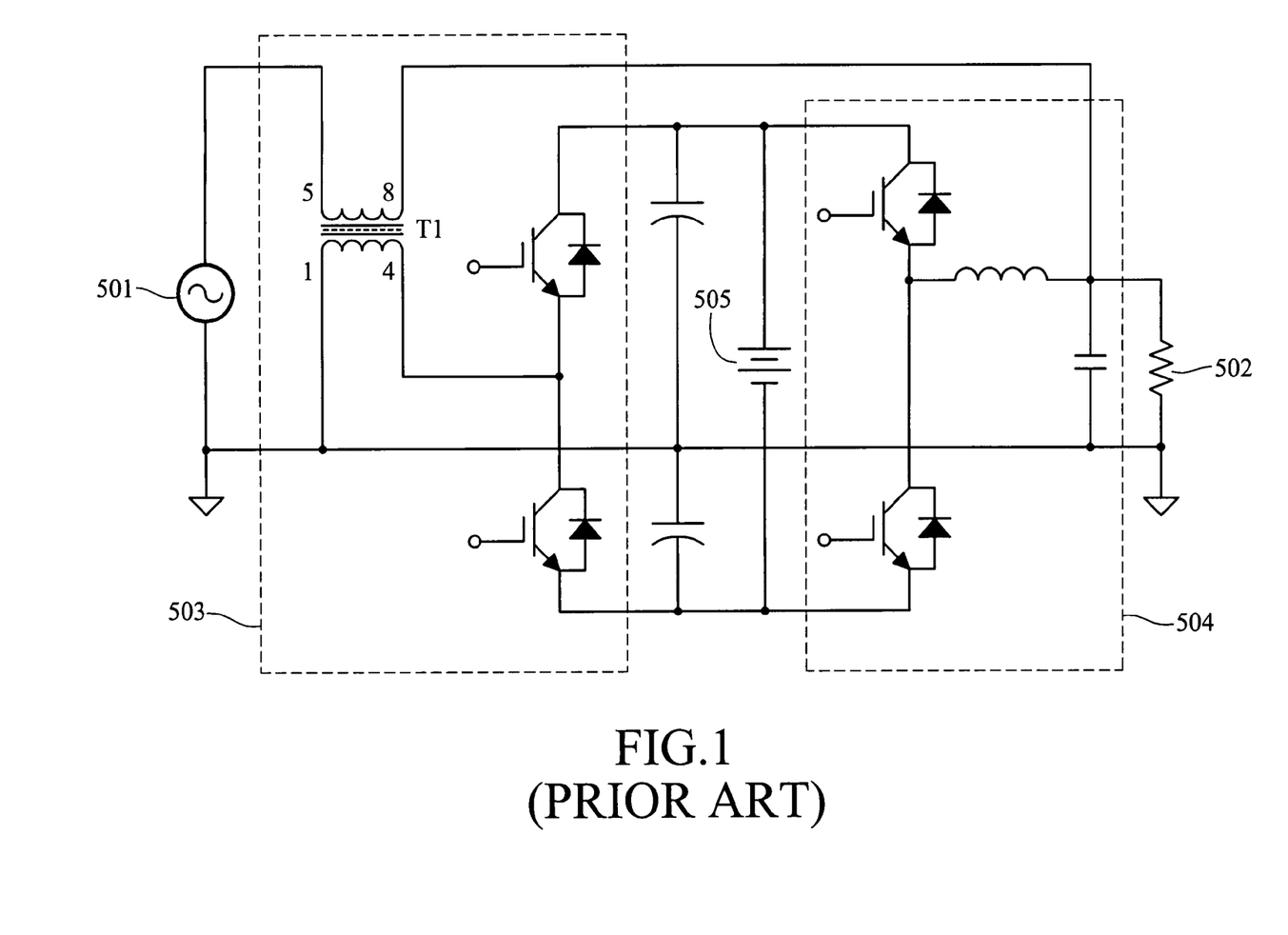
FIG. 1 is a schematic drawing illustration of a series-parallel UPS also known as the Delta conversion UPS.

All these structures can be regarded as a series-parallel structure which inherently generates less power losses and hence higher efficiency as it transmits real power from an AC power source to load only through one conversion. As shown in FIG. 1, this series-parallel structure uses a series converter 503 coupled between the AC power source 501 and load 502 of UPS, and an inverter 504 coupled between the DC power source 505 and load 502 of UPS. The series converter 503 is controlled to draw real power from input AC power source 501 and deliver it to the load 502; the inverter 504 generates a regulated voltage to the load 502. By the structure and control methods, the series converter 503 is able to compensate the voltage difference between the input and output voltage generated by the inverter 504, and draw a high power factor current from the AC power source 501; the inverter 504 is able to compensate the reactive power drawn by the load 502 and provide a regulated voltage to the load 502.

However, because the power of the AC power source is directly coupled to the load, the series-parallel UPS can function properly to receive power from the AC power source only when the frequency and phase between the AC power source and load of the UPS are tightly synchronized so that the converter and the inverter deliver in phase current to the load. If they are not synchronized, the inverter may deliver current while the converter draws current. This causes an overcurrent condition in the inverter or the shutdown of the converter.

Because frequency regulation of the input AC power source is not provided, the series-parallel UPS falls in the VI (voltage independent) classification defined by IEC62040-3 STEP1. The series-parallel UPS is inferior to the double conversion UPS.

In addition to the VI characteristic, the prior art series-parallel structures have other disadvantages; the Delta conversion UPS needs a bulky and expensive line frequency (60/50 HZ) transformer, shown as T1 in the FIG. 1; the structure of U.S. Pat. No. 5,687,768 needs no line frequency transformer but, in buck mode operations as in the FIG. 6 and the FIG. 8 of the specification of the patent, it generates discontinuous or pulsating current to the AC voltage source (utility power) causing severe electromagnetic interference (EMI) problems; the structure of U.S. Pat. No. 6,744,648 doesn't draw pulsating current from the AC input power source but it also needs a transformer to avoid the buck mode operation. And still, one common disadvantage of the prior art series-parallel structure is in the normal mode operation when supplying power to a nonlinear load. A nonlinear load generates significant reactive power that is assumed by the inverter of the UPS of a series-parallel structure; this reactive power contributes to additional power loss and deteriorates the efficiency of the UPS compared with the same UPS with a linear load generating no reactive power. All these disadvantages make the series-parallel structure less appealing compared with the double conversion structure.

Nevertheless, IEC62040-3 is not all favorable to the double conversion structure. It is common that loads in a UPS draw high start up current when the loads are applied to the UPS. The start up current can several times higher than a rated current to be normally protected so that the output of UPS is compromised unless the UPS is designed with several times the overload capacity IEC62040-3 STEP3 defines three classes for the output voltage tolerances of UPS upon a linear and nonlinear step load. In terms of IEC62040-3 STEP3, the series-parallel UPS is better than the double conversion UPS in providing high quality output voltage because the converter and the inverter of the series-parallel UPS jointly provide power to the load. By comparison, the power to the load is solely provided by the inverter in the double conversion UPS.

Unless enhancing the overload capacity of the inverter circuit, the double conversion UPS will be inferior to the series-parallel UPS per IEC62040-3 STEP3. An example for illustration is shown in U.S. Pat. No. 6,160,722, wherein the UPS structures according to the invention has an AC power source and a DC power source to supply the DC bus for the inverter to supply power to the load. Although the UPS has two power sources supplying power simultaneously, the power to the load is supplied solely by the inverter. Thus, the inverter itself became the bottleneck for supplying power to the load.

SUMMARY OF THE INVENTION

Accordingly, the present invention is directed to uninterruptible power supplies that substantially obviates one or more of the problems due to limitations and disadvantages of the related art.

It is an object of the invention to provide uninterruptible power supplies that have high efficiency and high quality output voltage in all conditions.

It is another object of the invention to provide uninterruptible power supplies with VFI performance that fully protects the loads of interruptible power supplies from voltage and frequency related utility power disturbances.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a converter is employed to draw current from an AC power source and then deliver the current selectively to a DC bus or a load of the UPS; an inverter is employed to receive power from the DC bus and provide a regulated voltage to the load of the UPS. As the current is configured to be delivered to the DC bus, the UPS is operated in a double conversion mode which features the VFI performance; while the current is configured to be delivered to the load, the UPS is operated in a series-parallel mode which features the higher efficiency and high quality output voltage. The efficiency of the UPS of present invention can be further improved over that of the series-parallel UPS in providing power to a nonlinear load. The efficiency improvement is achieved by operating the UPS of present invention in a hybrid of the double conversion and the series-parallel modes to reduce the reactive power assumed by the inverter of the UPS of present invention.

Jointly with the inverter, the converter of the present invention can also receive power from the DC bus to provide regulated voltage to the load to maintain the high quality output voltage in the stored energy mode or provide a redundancy for the inverter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the embodiments of the invention, examples of which are illustrated in the accompanying drawings. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 2:
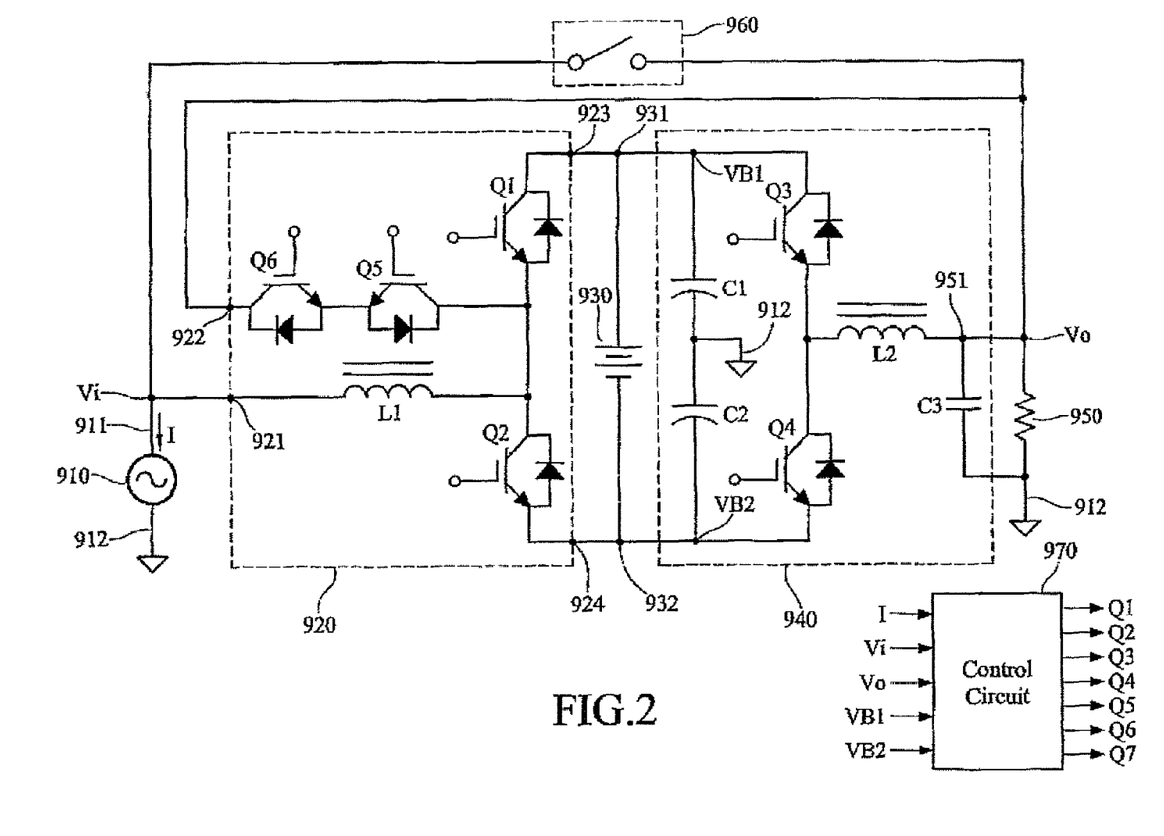
FIG. 2 is a schematic drawing of an embodiment according to present invention.

FIG. 2 illustrates an embodiment of an uninterruptible power supply (UPS) that can be configured to operate in a double conversion or a series-parallel mode according to the present invention.

The UPS comprises an input having a phase port 911 and a neutral port 912 for connecting to an AC power source 910, a converter 920, a DC power source 930 coupled to a DC bus comprising a first port 931, a second port 932 and a neutral port 912, an inverter 940, a output having a load port 951 and a neutral port for connecting to a load 950 and a bypass switch 960.

The converter 920 further comprises transistors with built-in or external connected anti-parallel diodes: Q1, Q2, Q5 and Q6, an inductor L1, a first port 921, a second port 922, a third port 923 connected to the first port 931 of the DC bus and a fourth port 924 connected to the second port 932 of the DC bus.

The inverter 940 further comprises transistors with built-in or external connected anti-parallel diodes: Q3, Q4, and a LC filter having an inductor L2 and a capacitor C3. In the double conversion mode operation, the transistors Q1 to Q4 are active, and the transistors Q5, Q6 are off.

When operated in this double conversion mode, power is converted from the AC power source 910 through the first port 921 of converter 920 to the first port 931 or second port 932 of DC bus, and the DC voltage is further converted to an AC voltage by the inverter 940 to provide a regulated voltage to the load 950. When the transistors Q1~Q6 of are all active, the UPS is operated in the series-parallel mode in which current drawn from the AC power source 910 is directly delivered to the load 950 through the second port 922 of the converter 920, in contrast to being delivered through the inverter 940 as operated in the double conversion operation.

In both modes the inverter 940 is operated to provide a regulated voltage to the load 950, but in the double conversion mode the inverter 940 provides all power drawn by the load 950 while in series-parallel mode the inverter 940 provides only the reactive power drawn by the load 950.

The converter 920 in its nature is a dc-dc boost converter capable of positive and negative voltage operations. The input to the converter 920 is the AC power source 910 with positive and negative half cycles; in the double conversion mode the outputs to converter 920 are the ports 931, 932 of the DC bus; in the series-parallel mode the output of converter 920 is the load 950 wherein the voltage, provided by the inverter 940, is sinusoidal and in phase with the AC power source 910.

Since the current drawn from the AC power source 910 must be controlled to supply the load 950 with no excessive power that will otherwise over charge the DC bus and because the current must be capable of being activated to ramp up and ramp down in a period of time to insure the current is controllable by using pulse width modulation (PWM) control, there are differences between the operations of the converter 920 in the double conversion and the series-parallel mode.

In the double conversion mode, the transistors Q1 and Q2 are enabled by way of PWM control to couple power from the AC power source 910 to the ports 931, 932 of the DC bus. The transistors Q1 and Q2 are operated in a complementary manner so that the turn-on of the transistor Q1 causes the current to ramp up while the turn-on of the transistor Q2 causes the current to ramp down, by control of their duty cycles the current can go up or down as desired.

In the series-parallel mode, the transistors Q5 and Q6 are enabled by way of PWM control to redirect the power to the load 950. The controls of the series-parallel operation are implemented according to whether the voltage of the AC power source 910 is greater or lower than the output voltage at the load 950 of UPS.

When the voltage of the AC power source 910 is lower than the output voltage of UPS at the load 950, during the positive half cycle of the voltage of the AC power source 910, the transistor Q2 is activated in a PWM way. The turn on of the transistor Q2 causes the current of the inductor L1 to ramp up; the turnoff of the transistor Q2 causes the current of the inductor L1 to ramp down and couples the current to the load 950 through the transistor Q5 and the anti-parallel diode of transistor Q6. The transistor Q5 is always turned on during the whole positive half cycle even when the transistor Q2 is turned on, because the anti-parallel diode of transistor Q6 allows current to go only from the transistor Q5 through it to the load 950. The current never reverses and goes through the transistor Q2.

Still, when the voltage of AC power source 910 is lower than the output voltage of UPS at the load 950 during the negative half cycle of the voltage of AC power source 910, the transistor Q1 is activated in a PWM way. The turn-on of the transistor Q1 causes the current of inductor L1 to ramp down; the turn-off of Q1 causes the current of the inductor L1 to ramp up and couples the current to the load 950 through the transistor Q6 and the anti-parallel diode of transistor Q5. The transistor Q6 can be always turned on during the whole negative half cycle even when the transistor Q1 is turned on, because the anti-parallel diode of transistor Q5 allows the current to go only from load 950 through it to the transistor Q6. The current never reverses and goes through the transistor Q1.

When the voltage of AC power source 910 is higher than the output voltage of UPS at the load 950 during the positive half cycle and the voltage of AC power source 910 is, the transistor Q5 is activated in a PWM way. The turn-on of transistor Q5 causes the current in the inductor L1 to ramp up and couples the current to the load 950 of UPS. The turn-off of transistor Q5 causes the current in the inductor L1 to ramp down and couples the current to the DC bus 931 through the anti-parallel diode of transistor Q1.

Still, when the voltage of AC power source 910 is higher than the output voltage of UPS at load 950 during the negative half cycle the voltage of the AC power source, the transistor Q6 is activated in a PWM way. The turn-on of transistor Q6 causes the current of the inductor L1 to ramp down and couples the current to load 950, the turn-off of transistor Q6 causes the current of the inductor L1 to ramp up and couples the current to the second port 932 of the DC bus through the anti-parallel diode of transistor Q2.

Figure 3:
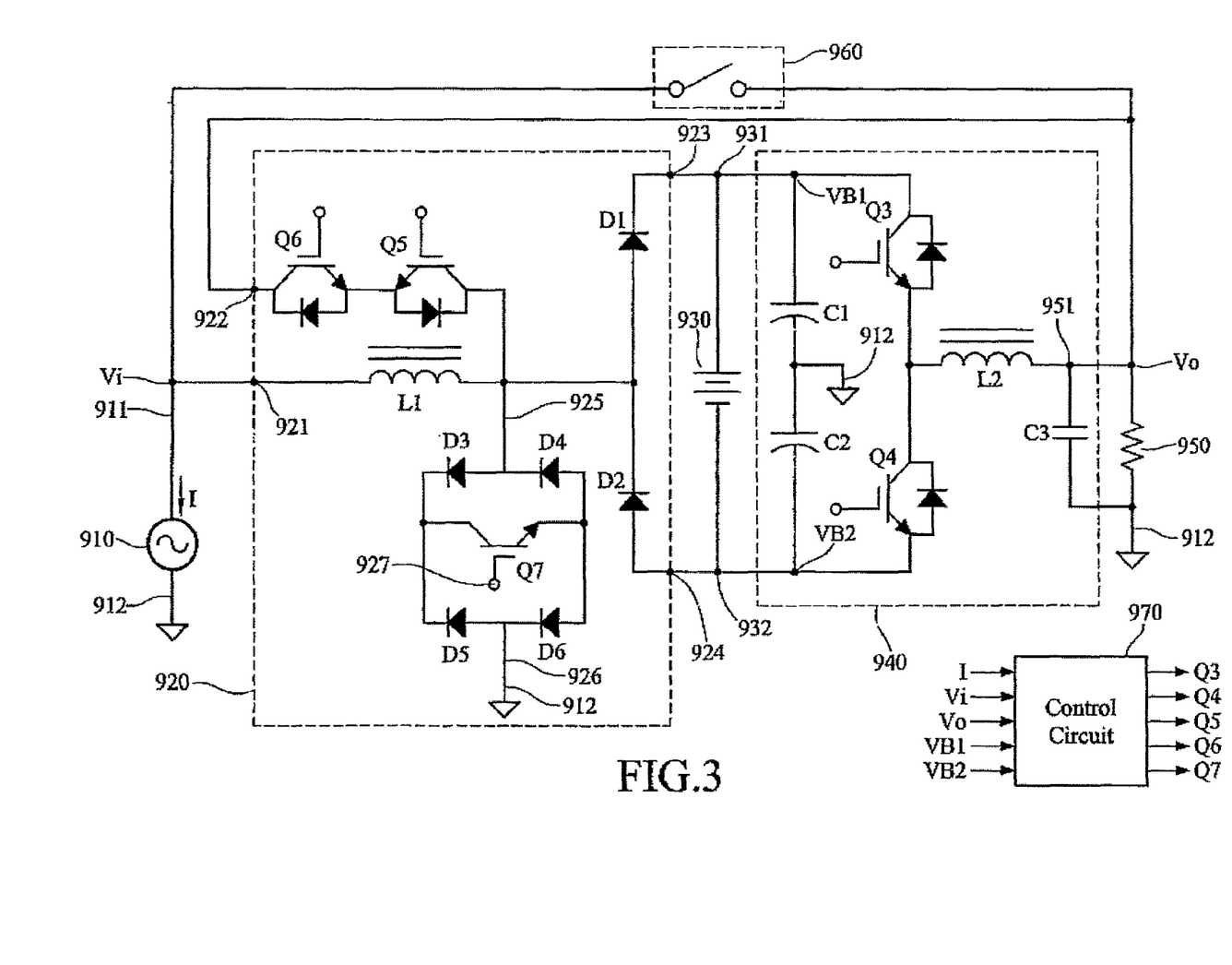
FIG. 3 is a schematic drawing of another embodiment according to present invention.

FIG. 3 illustrates another embodiment of an uninterruptible power supply (UPS) that can be configured to operate in a double conversion or a series-parallel mode according to the present invention.

The UPS comprises an AC power source 910, a converter 920 a DC power source 930 coupled to a DC bus comprising a first port 931 and a second port 932, an inverter 940, a load 950 and a bypass switch 960. The load 950 is connected to an output of the UPS. The AC power source 910 is connected to an input of the UPS.

The circuits and function of which except the converter 920 are the same as the embodiment described aforementioned.

The conversion 920 further comprises transistors with built-in or external connected anti-parallel diodes: Q5 and Q6, an indicator L1, a first port 921, a second port 922, a third port 923 connected to the first port 931 of the DC bus and a fourth port 924 connected to the second port 932 of the DC bus.

The first port 921 is coupled to the phase port 911 of the AC power source 910. When the transistor Q7 turns on in responsive to the control signals from the control circuit, the second port 925 is coupled to the neutral port 912 of the AC power source 910 through the first switching means of the converter. Alternatively, the first or second port of the DC bus is coupled to the load 950 through the second switching means of the converter. The first switch means includes diodes D3 to D6. The second switch means includes the transistor Q5 and the transistor Q6.

A first diode D1, a second diode D2 and a bidirectional switch circuit having a first port 925, a second port 926, and a gate port 927 receiving control signal from the control circuit to enable or disable the bidirectional switch circuit. The bidirectional switch circuit includes diodes D3 to D6 and a transistor Q7.

It should be noted that the DC power source of the UPS of present invention may comprise batteries to provide a predetermined DC voltage to the DC bus; this is usually practiced in high power UPS having large numbers of batteries, or comprise batteries and a DC-DC converter coupled between the batteries and the DC bus to convert the voltage of batteries to the predetermined voltage at DC bus; this is usually practiced in small sized UPS having fewer batteries.

Since in the conventional double conversion operation the converter has DC voltage outputs with negligible ripples and it is operated always in a boost mode, a conventional control method can be used to achieve the desired performance. But in the series-parallel operation of the present invention the output of the converter 920 is the load 950 of UPS at which the voltage is sinusoidal and the converter 920 is actually operated in a boost or a buck mode, the switching between the transistors Q1, Q2, Q5 and Q6 as mentioned above and the PWM control of their duty cycle generations need to be implemented by different methods instead of the conventional method for optimal performance.

The conventional PWM current control analysis begins with developing of a plant model to accordingly obtain a plant dynamic. The plant dynamic, in terms of operating frequencies and specified voltages, is the relationship of a control signal Vc to the actual current I-actual it causes to flow from a voltage source through the plant, and then the design's goal is to develop a proportional integral (PI) controller or a compensator that receives the current signal and amplifies it with characteristics of P and I parameters to generate the control signal Vc. The PI controller associated with the plant dynamic, as properly designed, can optimize the control of the current to follow a current flow command signal. It should be noted that, because of the nature of pulse width modulation (PWM), the plant model of the conventional current control analysis first relates the control signal Vc into two time intervals; each time interval is a state with a specific voltage applied to an indicator. For each time integral, products of the voltages and time intervals may be obtained, for example, $V_1$ times $T_1$ and $V_2$ times $T_2$. Then the two products $V_1$ times $T_1$ and $V_2$ times $T_2$ are summed and divided by the sums of total time intervals to obtain an average voltage whereby causing the inductor current to flow.

One simplified plant dynamic or transfer function derived from this conventional method can be found in the equation (7) of the application note U140 "Average current mode control of switching power supplies" published by Unitrode Corporation. The transfer function shows the gain of the actual current over the current control signal Vc is proportional to the output voltage Vo and reverses proportional to the inductor value L and frequency f. This transfer function is valid only in high frequency range because the plant model assumes the input and output voltages are constant.

The problem will be worse if using the conventional control method in the converter control of present invention, because in the series-parallel mode operation the output to the converter of the present invention is a sinusoidal voltage instead of a dc voltage with negligible ripples as in the conventional converter. To address the problem, a space vector PWM method is used.

Figure 4:
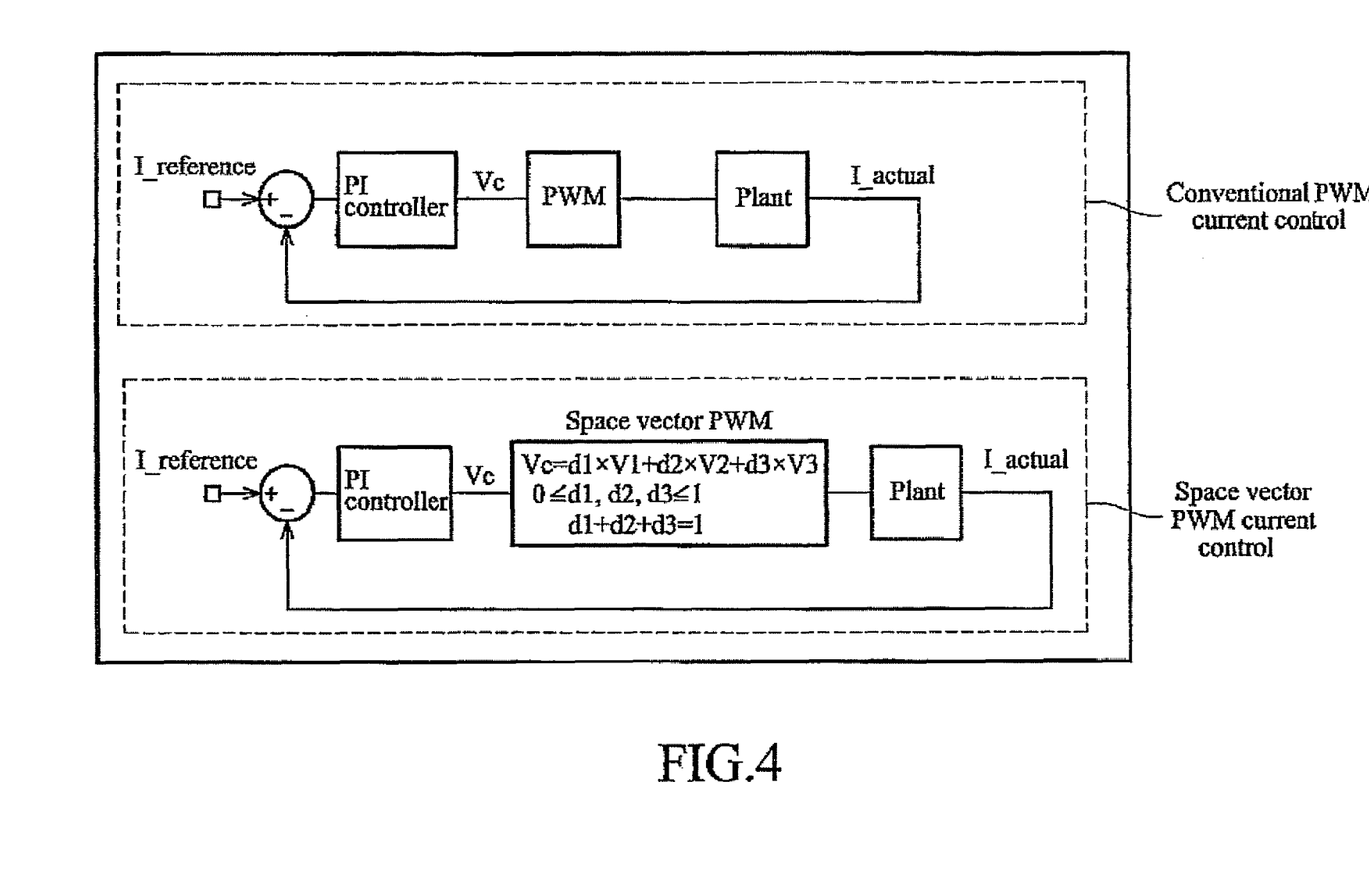
FIG. 4 is a block diagram illustrating a conventional PWM current control versus the space vector PWM current control used in the present invention.

A block diagram illustrates the conventional control versus the space vector control used in the present invention is shown in FIG. 4. The space vector PWM, though widely used in the three phase PWM control, is adapted for use in the present invention.

Figure 5:
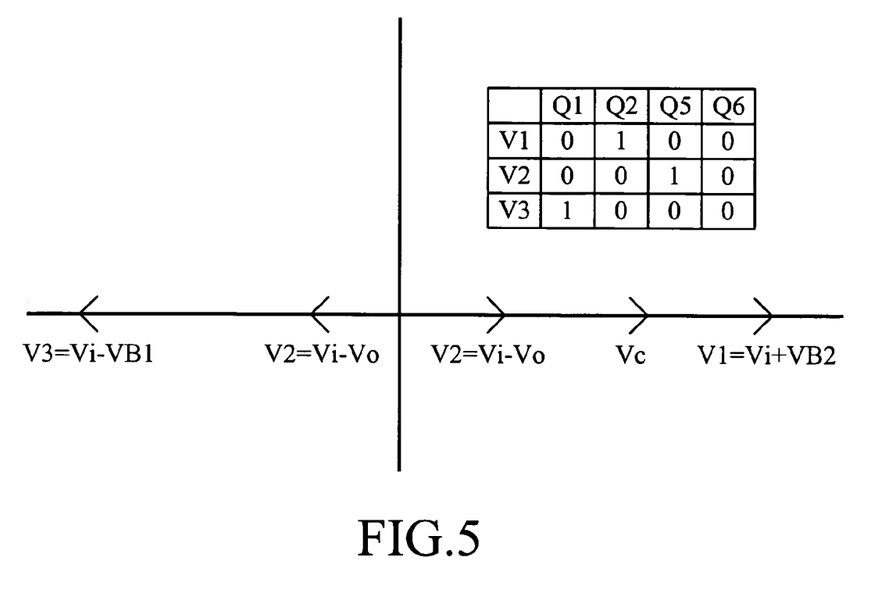
FIG. 5 is a schematic diagram illustrating the space vector of Vc>0 to be decomposed into combinations of V1, V2 or V3.
Figure 6:
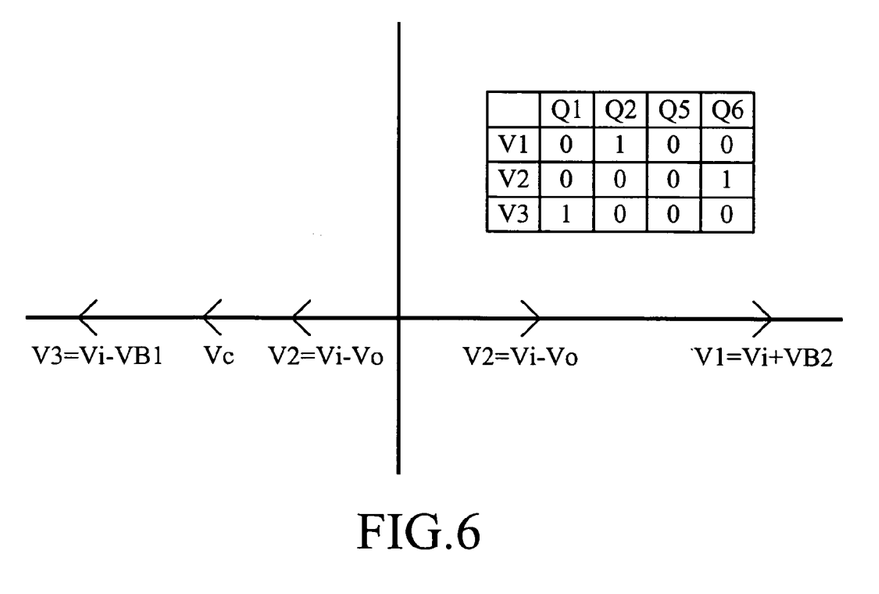
FIG. 6 is a schematic diagram illustrating the space vector of Vc<0 to be decomposed into combinations of V1, V2 or V3.

As illustrated in FIG. 5 of the positive half cycle and in FIG. 6 of the negative half cycle, Vc represents a desired vector of a specified magnitude and a polarity that is intended to apply across the inductor to induce a desired current in the UPS embodiment of the FIG. 2, V1, V2 and V3 are the real vectors, to be applied to the inductor, which are caused by the statuses of transistors Q1, Q2, Q5 and Q6 associated with voltage present at the load port 951 of the load 950, hereinafter referred to as Vo. The voltage at the phase port 911 of the AC power source 910 is referred to as Vi hereinafter. The voltage at the first port 931 of the DC bus is referred as VB1 hereinafter. The voltage at the second port 932 of the DC bus is referred as VB2 hereinafter. The Vo, Vi, VB1 and VB2 are all in reference to the neutral port 912 of the AC power source 910. V1 has an intensity of Vi+VB2 when Q2 is enabled. V2 has an intensity of Vi−Vo when Q5 is enabled in the positive half cycle or Q6 is enabled in the negative half cycle. V3 has an intensity of Vi−VB1 when Q1 is enabled. The voltages affect the intensity and polarity of the vectors V1, V2 and V3, while the statuses of transistors Q1, Q2, Q5 and Q6 contribute to the polarities of the vectors.

It can be seen from FIG. 5 and FIG. 6 that there are two V2 vectors, this is because the AC power source voltage can range from, for example, less than 20% to greater than 20% of nominal voltage. In the positive half cycle, a negative V2 vector means (Vi−Vo)<0 while a positive V2 vector means (Vi−Vo)>0. The V1, V2 and V3 vectors are acquired by sensing the real time voltage of Vi, Vo, VB1 and VB2. Vc can then be decomposed into combinations of two or three of V1, V2 and V3 vectors with specific time intervals or duty cycles in a space vector PWM manner to activate the transistors Q1, Q2, Q5 or Q6. This space vector PWM method is straightforward. In case the Vc falls between the V1 and V2, the duty cycles d of V1 and V2 are obtained. In solving the equation of Vc=d× V1+(1−d)×V2. In case Vc is less than V1 and V2 and the Vc, V1 and V2 are positive, only a combination of V1 and V3 (double conversion mode) or V2 and V3 (series-parallel mode) can form the Vc vector, by solving the same equation as shown above. Thus, the duty cycle d of V1 and V2 or V1 and V3 is obtained. The vectors V1, V2, V3 and their corresponding transistors Q1, Q2, Q5 or Q6 to be activated are shown in the right upper table in FIG. 5 and FIG. 6.

Figure 7:
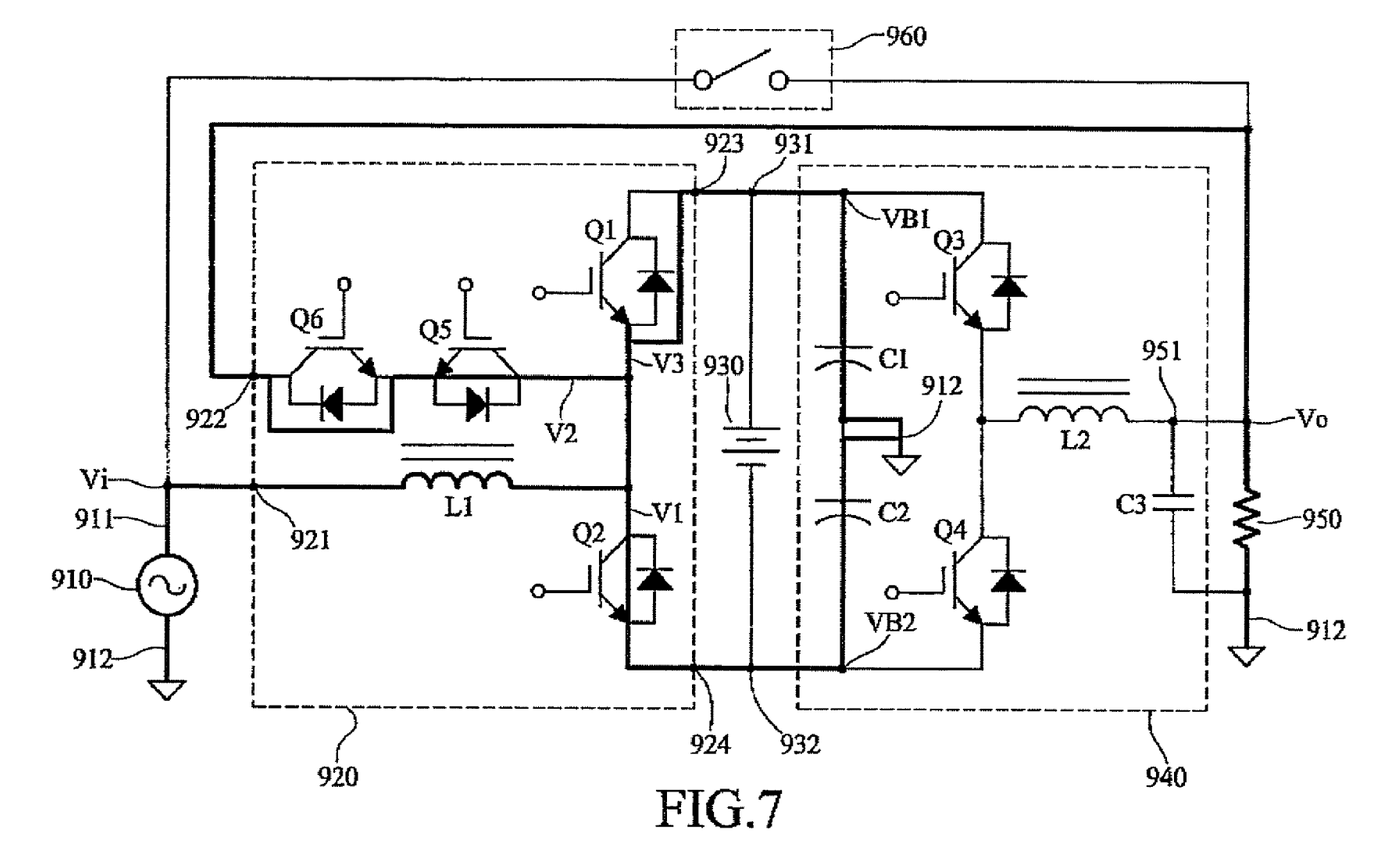
FIG. 7 is a schematic diagram illustrating the current paths corresponding to V1, V2 and V3 vectors in the positive half cycle.

FIG. 7 illustrates the current paths corresponding to V1, V2 and V3 vectors in the positive half cycle of the AC power source 910. In the V1 vector path, the current flows forward from the port 911 into port 912 of the AC power source 910, through L1, Q2 and C2. In the V2 vector path, the current flows forward from the port 911, into port 912 of the AC power source 910, through L1, anti-parallel diode of Q1 and C1. In the V3 vector path, the current flows forward from the port 911 into port 912 of the AC power source 910, through L1, Q5, anti-parallel diode of Q6 and LOAD 950.

Figure 8:
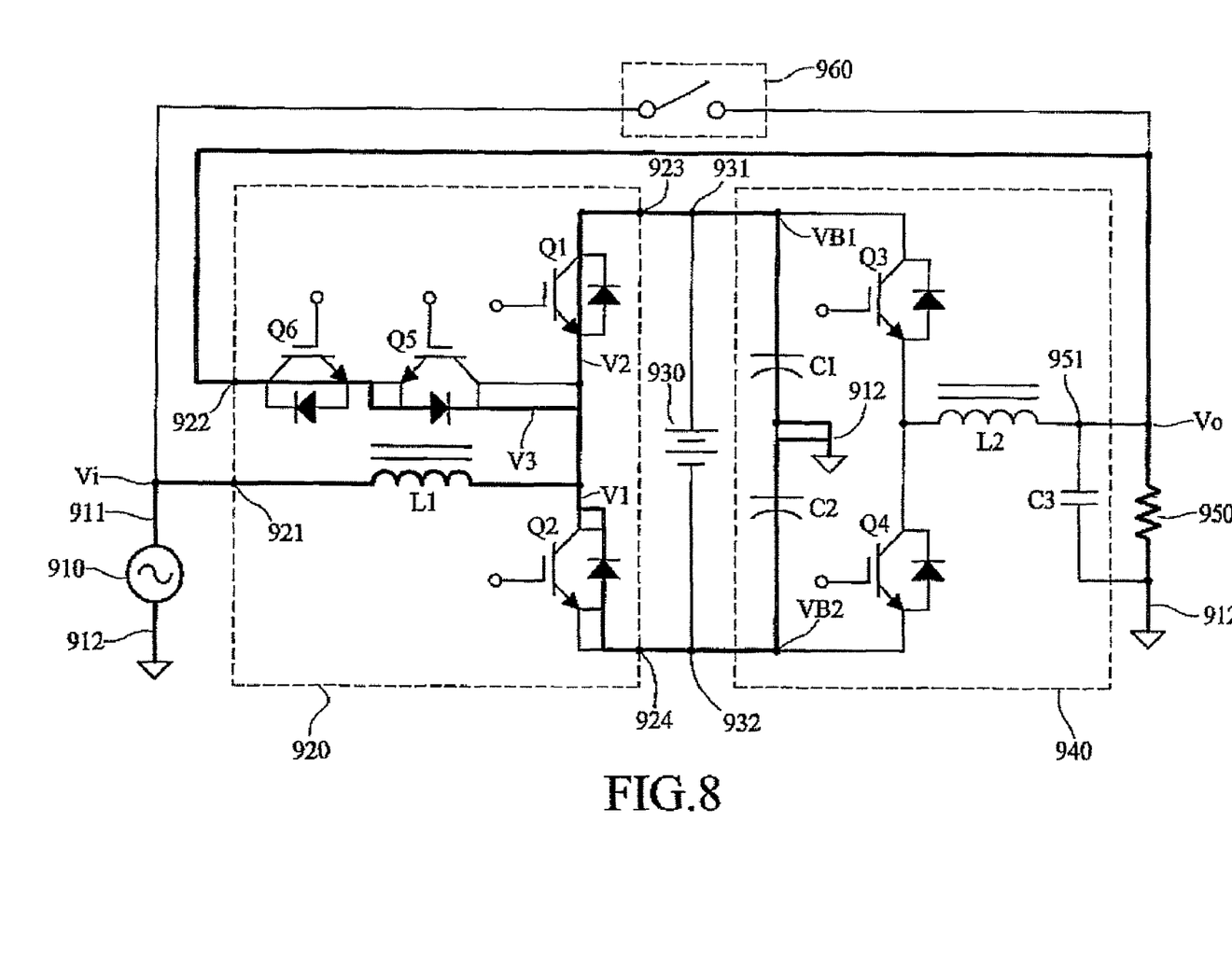
FIG. 8 is a schematic diagram illustrating the current paths corresponding to V1, V2 and V3 vectors in the negative half cycle.

FIG. 8 illustrates the current paths corresponding to VI, V2 and V3 vectors in the negative half cycle of the AC power source 910. In the VI vector path, the current flows into the port 911 from the port 912 of the AC power source 910, through L1, anti-parallel diode of Q2 and C2. In the V2 vector path, the current flows into the port 911 from the port 912 of the AC power source 910, through L1, QI and C1. In the V3 vector path, the current flows into the port 911 from the port 912 of the AC power source 910, through L1, anti-parallel diode of Q5, Q6 and the LOAD 950.

It should be noted that the control methods to implement the structure of the invention are not confined to the space vector PWM method shown above, the conventional method as illustrated in U140 "Average Current Mode Control of Switching Power Supplies" can be also used, though with less desired results.

How the provided UPS improve efficiency is described as follows. The power loss in the series-parallel operation compared with that of the double conversion operation is illustrated by referring to the prior art as shown in U.S. Pat. No. 6,266,260, in the so called high efficiency mode the current drawn by the load has to go through the inductor 130, the diode 132, the diode 136, the transistor 112 and the inductor 148, to implement the same node with the embodiment of the present invention as shown in FIG. 2, current will go through the indicator L1, the transistor Q5 and the anti-parallel diode of transistor Q6. It is clear the power loss is significantly lower in the embodiment of the present invention than that in the double conversion operation of U.S. Pat. No. 6,266,260.

The efficiency of the UPS of the present invention can also be improved over the series-parallel mode when supplying power to a nonlinear load. The series-parallel mode has high efficiency when supplying power to a linear load, because the inverter of the UPS provides no real power and reactive power; the real power is supplied by the converter of the UPS while the load draws no reactive power. However, the efficiency of the series-parallel mode is deteriorated when supplying power to a nonlinear load, because the nonlinear load draws a significant reactive power. The reactive power can be only provided by the inverter. The reactive power, causing additional power losses of the inverter and the UPS, arises from an intermittent current drawn by the nonlinear load from the power source supplied to the load. As shown in FIG. 10 of U.S. Pat. No. 5,686,768, the load current IL comprises a sinusoidal (liner) and a pulsating (nonlinear) current. The pulsating current is provided by the inverter shown as Ivr which causes more power losses and worsens the efficiency. But if the pulsating is not presented in the load current, the inverter needs not to provide the pulsating current to the load. If a load draws only a pulsating current (nonlinear), like Ivr, in one cycle there are time intervals of non-zero current. The zero current is referred as off period hereinafter and the non-zero interval is referred as on period hereinafter. The non-sinusoidal current includes a non-zero current during an on period and a zero current during an off period. During the off period, because the converter of the series-parallel UPS should preferably draw sinusoidal current from the input AC power source and deliver the current to the load but the load draws zero current, the current can be only absorbed by the inverter and fed to the DC bus of the UPS. The current flowing in the inverter in this manner contributes to the reactive power causing additional power losses. The UPS of the present invention can eliminate the reactive power to improve the efficiency of the UPS by operating the UPS in a hybrid of the double conversion mode and the series-parallel modes. In the off period, the UPS of present invention is operated in the double conversion mode that the current drawn from the AC power source is delivered to the DC bus. In the on period, the UPS of the present invention is operated in the series-parallel mode benefiting the high efficiency for the current to the load is shared by the converter and the inverter of the UPS. In practical applications, a current sensor may be or may not be used to detect the on period and off period of the load to complete the hybrid operation. Since the on period usually occurred two or three milliseconds around the peaks of the voltage supplying the load, the UPS of the present invention may be configured to operated in the double conversion and the series-parallel at predetermined times to avoid the use of the current sensor. By this hybrid operation the efficiency of the UPS of present invention is optimized.

In addition to the efficiency improvement, since the AC power and DC power together are directly supplied to the load, the power supplied to the load from the series-parallel structure can be twice of that for a double conversion UPS. This enables UPS to meet IEC62040-3 STEP3 requirements in which the UPS must provide a regulated voltage without being distorted to specific limits when subject to linear and nonlinear step loads. To further address IEC62040-3 STEP3 requirements in the stored energy mode, the converter 920 of the UPS embodiment in FIG. 2 can be configured to receive power from the AC power 930 to jointly provide power with the inverter 940 to the load 950. In this configuration a bypass switch 960 is employed to couple the first port 921 of converter 920 to the load 950, the DC power is converted to the load 950 via the transistor, the inductor L1 of converter 920 and the bypass switch 960 alternately turning on the transistors Q1, Q2. The converter 920 can receive power from ports 923 and 924 and delivers an AC power at port 921. The power generated by converter 920 at port 921 is coupled to the load 950 by turning on the bypass switch 960. Since both converter 920 and inverter 940 can provide a regulated voltage to the load 950 of UPS, the UPS in this configuration can be operated essentially in the parallel manner that provides higher overload capability to maintain the high quality output voltage in the event of a nonlinear or linear step load.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An interruptible power supply comprising:
    an input for receiving an AC power source;
    an output for connecting to a load;
    a DC bus coupled with a DC power source;
    an inverter receiving the current from said DC bus to generate an AC voltage to said load;
    a control circuit responsive to the voltage and the current of said AC power source, the AC voltage of said inverter and a voltage at said DC bus coupled with said DC power source to generate control signals to said inverter; and
    a converter, responsive to control signals from said control circuit, drawing current from the input receiving said AC power source and delivering the current to said DC bus or said output; and
    wherein the input comprises a phase port and a neutral port; the DC bus comprises a first port, a second port and a neutral port; the output comprises a load port and a neutral port,
    wherein the converter comprises a first switching means, a second switching means and an indicator having a first port coupled to the phase port of the input and a second port, wherein the second port of the inductor in response to the control signals from said control circuit is coupled to the first or the second port of said DC bus through the first switching means of the converter or coupled to said load through the second switching means of the converter alternatively.

2. The uninterruptible power supply according to claim 1, wherein the first switching means of said converter comprises a first transistor and a second transistor, the second switching means of said converter comprises a first transistor and a second transistor.

3. The uninterruptible power supply according to claim 2, wherein each transistor has an anti-parallel diode, and a gate port receiving a control signal from the control circuit to enable or disable the transistor.

4. The uninterruptible power supply according to claim 3, wherein the emitted of the first transistor of first switching means, the collector of the second transistor of the first switching means and the collector of the first transistor of second switching means are connected to the second port of the inductor of said converter; wherein the collector of the first transistor of first switching means is connected to the first port of said DC bus; the emitter of the second transistor of the first switching means is connected to the second port of said DC bus; wherein the emitter of the first transistor of second switching means is connected to the emitter of the second transistor of second switching means and the collector of the second transistor of second switching means is connected to said load.

5. The uninterruptible power supply according to claim 4, wherein in a first state, the second port of the inductor is coupled to the first port of said DC bus by enabling the first transistor of the first switching means of converter; wherein in a second state, the second port of the inductor is coupled to the second port of said DC bus by enabling the second transistor of the first switching means of said converter; wherein in a third state, the second port of the inductor is coupled to the load port of said load by enabling the first transistor of the second switching means of said converter in the positive half cycle or by enabling the second transistor of the second switching means of said converter in the negative half cycle.

6. The uninterruptible power supply according to claim 1, wherein currents of said AC power source go from the phase port to the neutral port in a positive half cycle of the AC power source; the currents of from the neutral port and to the phase port in a negative half cycle of the AC power source.

7. The uninterruptible power supply according to claim 1, wherein the DC power source comprises batteries coupled to the DC bus, or comprises batteries and a DC-DC converter coupled between the batteries and the DC bus.

8. An uninterruptible power supply comprising:
    an input for receiving an AC power source;
    an output for connecting to a load;
    a DC bus coupled with a DC power source;
    an inverter receiving the current from said DC bus to generate an AC voltage to said load;
    a control circuit responsive to the voltage and the current of said AC power source, the AC voltage of said inverter and a voltage at said DC bus coupled with said DC power source to generate control signals to said inverter; and
    a converter, responsive to control signals from said control circuit, drawing current from the input receiving said AC power source and delivering the current to said DC bus or said output;

wherein the input comprises a phase port and a neutral port; the DC bus comprises a first port, a second port and a neutral port; the output comprises a load port and a neutral port, wherein the converter comprises a first switching means, a second switching means and an inductor having a first port coupled to phase port of said AC power source and a second port, wherein the second port of the inductor is coupled to the neutral port of said AC power source, coupled to the first or second port of said DC bus through the first switching means of said converter or coupled to the load port of said load through the second switching means of said converter, responsive to the control signals from said control circuit.

9. The uninterruptible power supply according to claim 8, wherein the first switching means of said converter comprises a first diode, a second diode and a bidirectional switch circuit having a first port, a second port, and a gate port receiving a control signal from said control circuit to enable or disable the bidirectional switch circuit.

10. The uninterruptible power supply according to claim 9, wherein the second switching means of said converter comprises a first transistor and a second transistor; each transistor has an anti-parallel diode and a gate port receiving control signals from the control circuit to enable or disable the transistor.

11. The uninterruptible power supply according to claim 10, wherein the anode of the first diode of first switching means, cathode of the second diode of first switching means, first port of the bidirectional switch and the collector of the first transistor of second switching means are connected to the second port of the inductor of said converter.

12. The uninterruptible power supply according to claim 11, wherein the second port of the bidirectional switch of first switching means is connected to the neutral port of said AC power source.

13. The uninterruptible power supply according to claim 12, wherein the cathode of the first diode of first switching means is connected to the first port of said DC bus.

14. The uninterruptible power supply according to claim 13, wherein the anode of the second diode of first switching means is connected to the second port of said DC bus.

15. The uninterruptible power supply according to claim 14, wherein the emitter of the first transistor of second switching means is connected to the emitter of the second transistor of second switching means and; the collector of the second transistor of second switching means is connected to the load port of said load.

16. The uninterruptible power supply according to claim 15, wherein in a first state, the second port of the inductor is coupled to neutral port of said AC power source by enabling the bidirectional switch circuit of first switching means; wherein in a second state, the second port of the inductor is coupled to the first port of said DC bus as the first diode of first switching means is conducted in positive half cycle or the second port of the inductor is coupled to the second port of said DC bus as the second diode of first switching means is conducted in the negative half cycle; wherein in a third state, the second port of the inductor is coupled to said load by enabling the first transistor of the second switching means of said converter in the positive half cycle or by enabling the second transistor of the second switching means of said converter in the negative half cycle.

17. The uninterruptible power supply according to claim 8, wherein currents of said AC power source go from the phase port to the neutral port in a positive half cycle of the AC power source; the currents go from the neutral port and to the phase port in a negative half cycle of the AC power source.

18. The uninterruptible power supply according to claim 8, wherein the DC power source comprises batteries coupled to the DC bus, or comprises batteries and a DC-DC converter coupled between the batteries and the DC bus.

\* \* \* \* \*